Nov. 29, 1966     T. M. ELFVING     3,287,923

THERMOELECTRIC ASSEMBLY

Filed March 22, 1965     13 Sheets-Sheet 1

INVENTOR.
THORE M. ELFVING
BY
ATTORNEYS

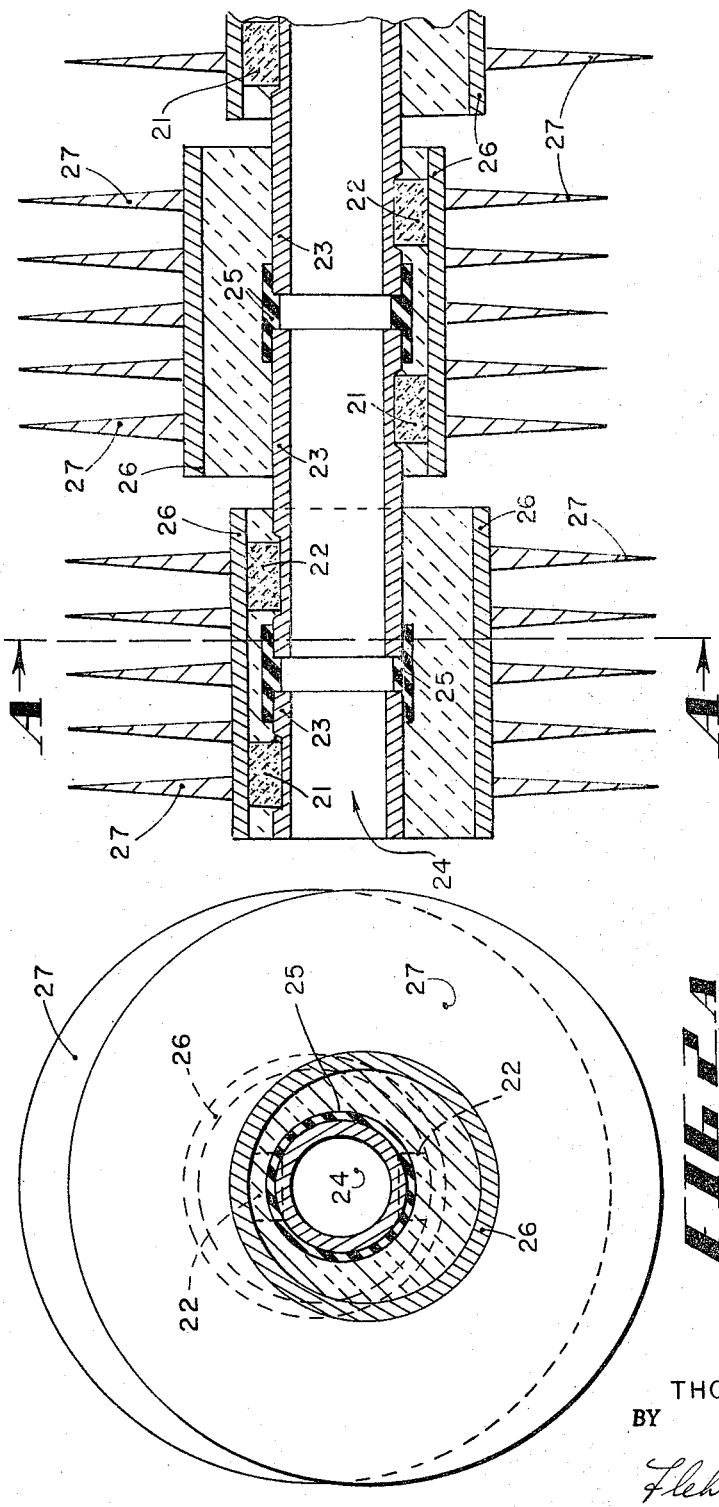

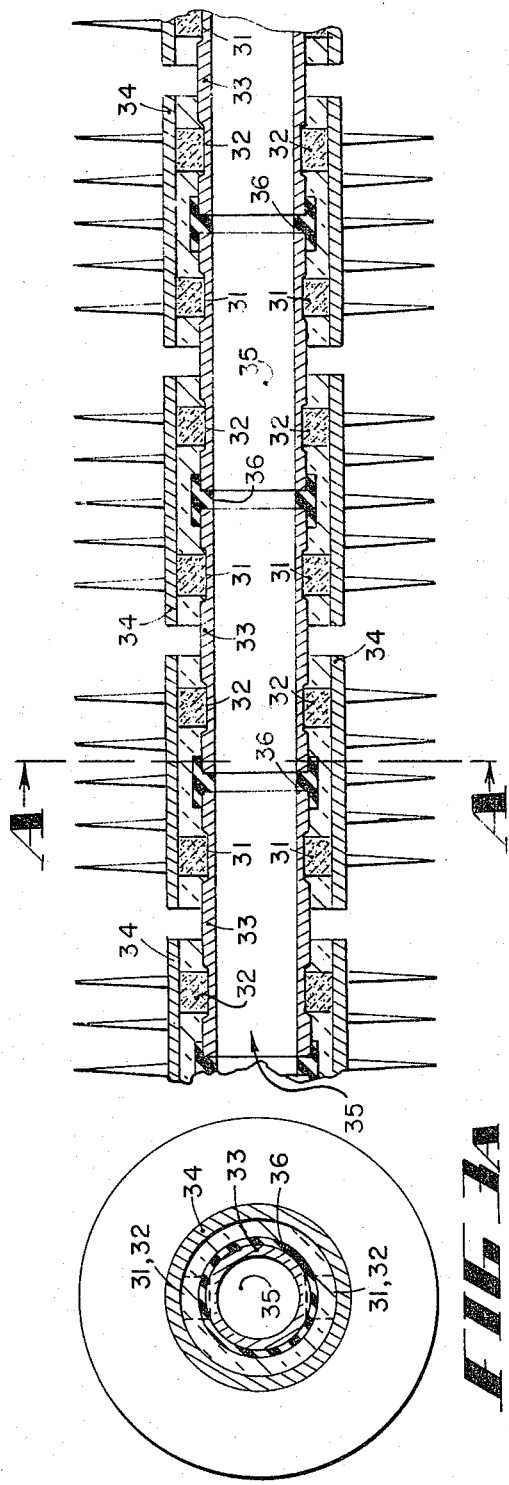

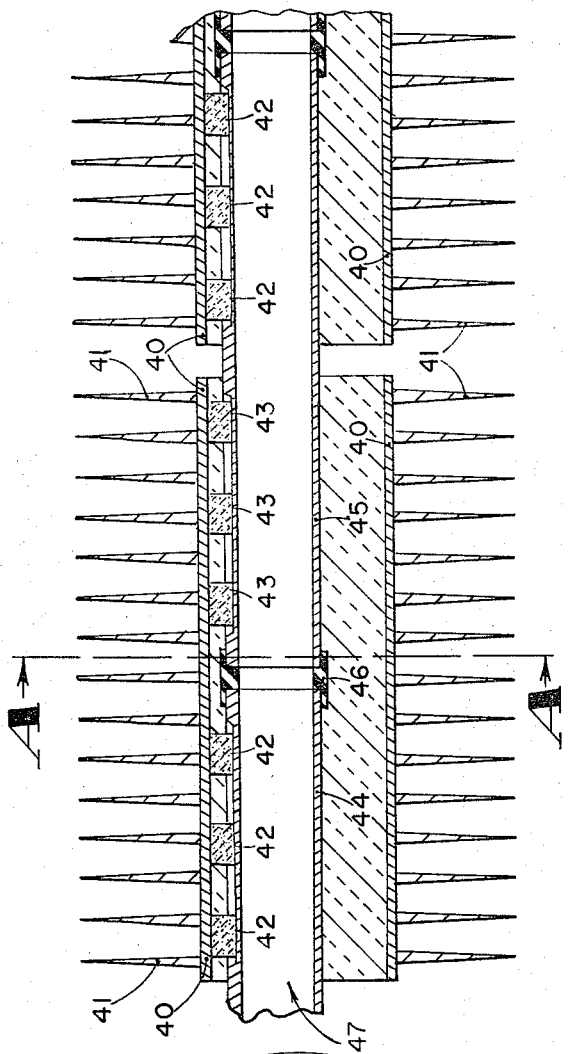
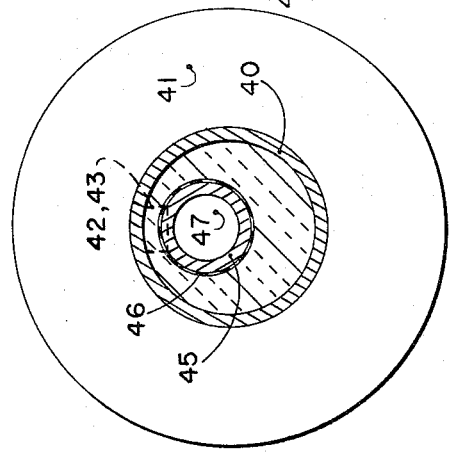

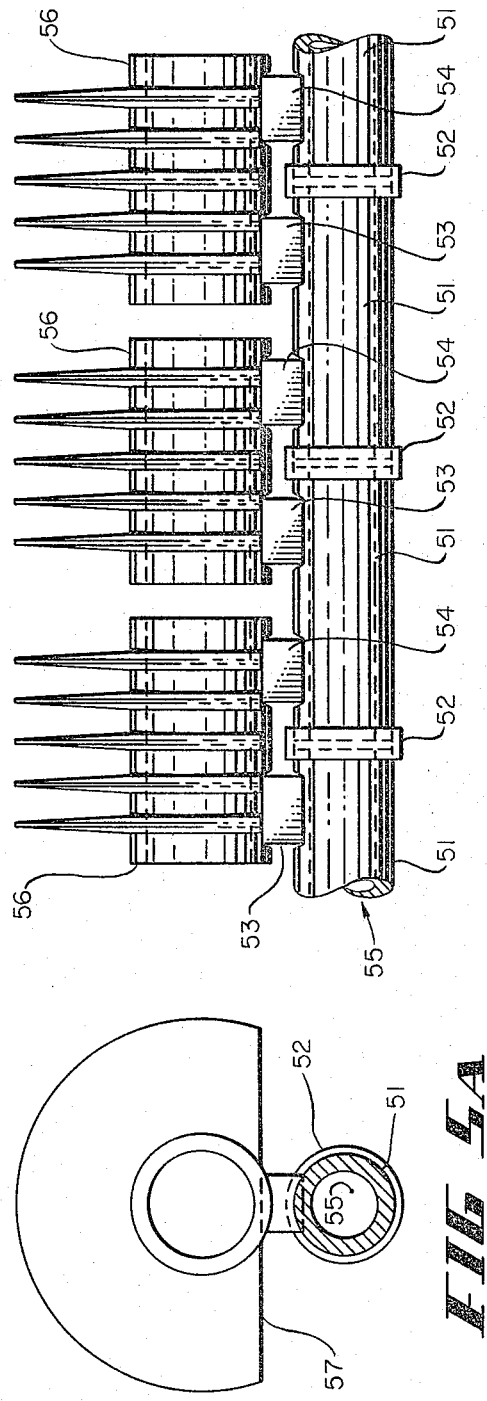

Nov. 29, 1966 T. M. ELFVING 3,287,923
THERMOELECTRIC ASSEMBLY
Filed March 22, 1965 13 Sheets-Sheet 6

INVENTOR.
THORE M. ELFVING
BY
ATTORNEYS

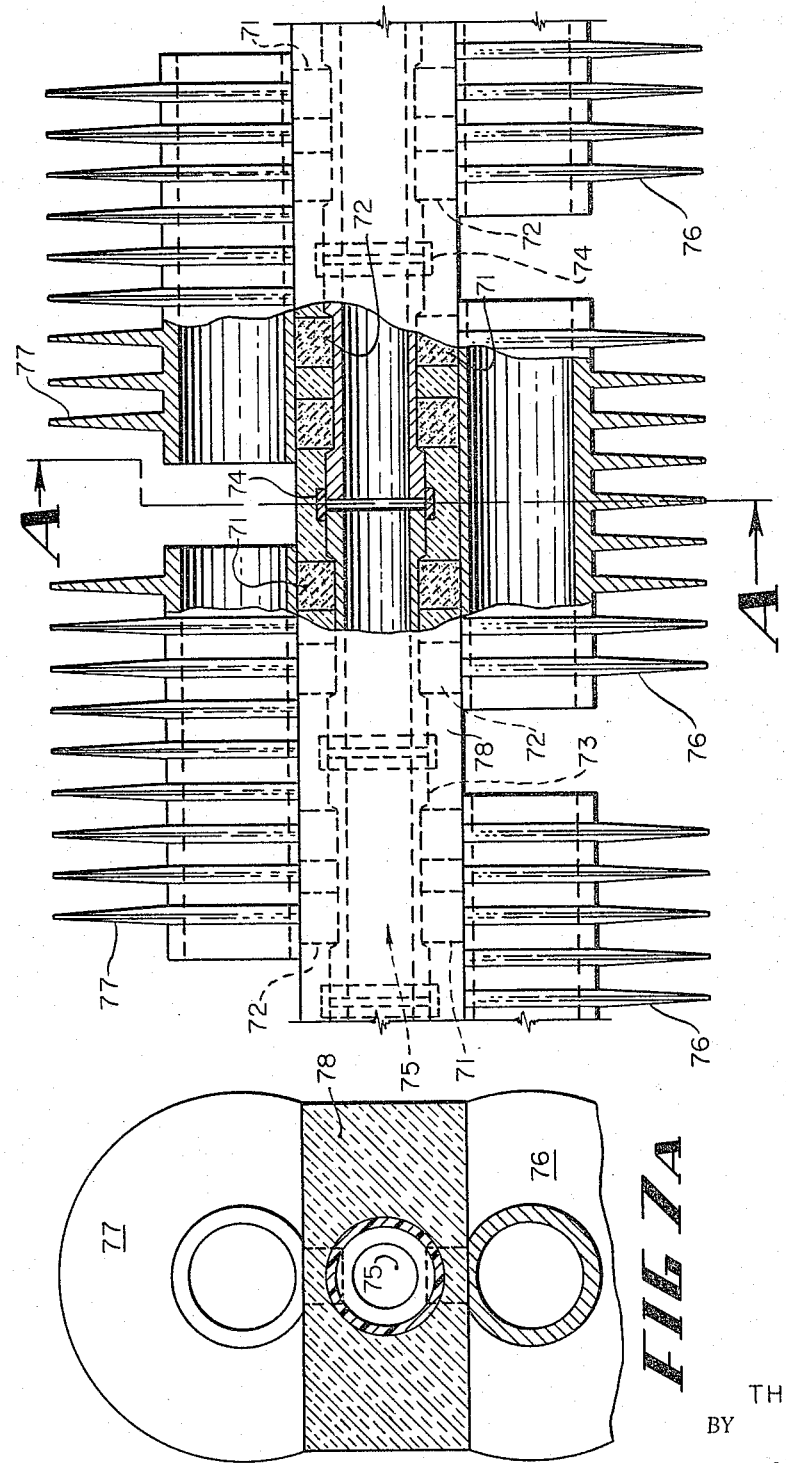

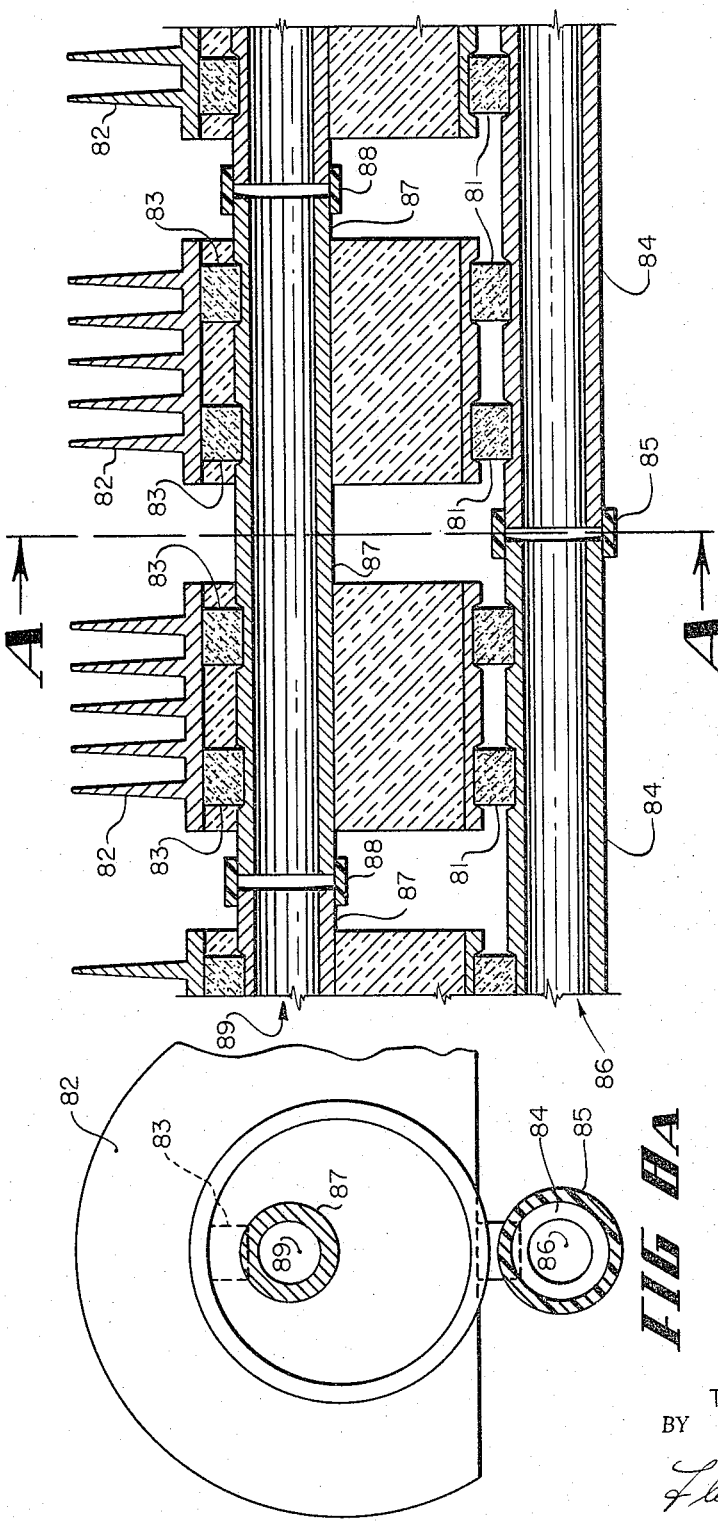

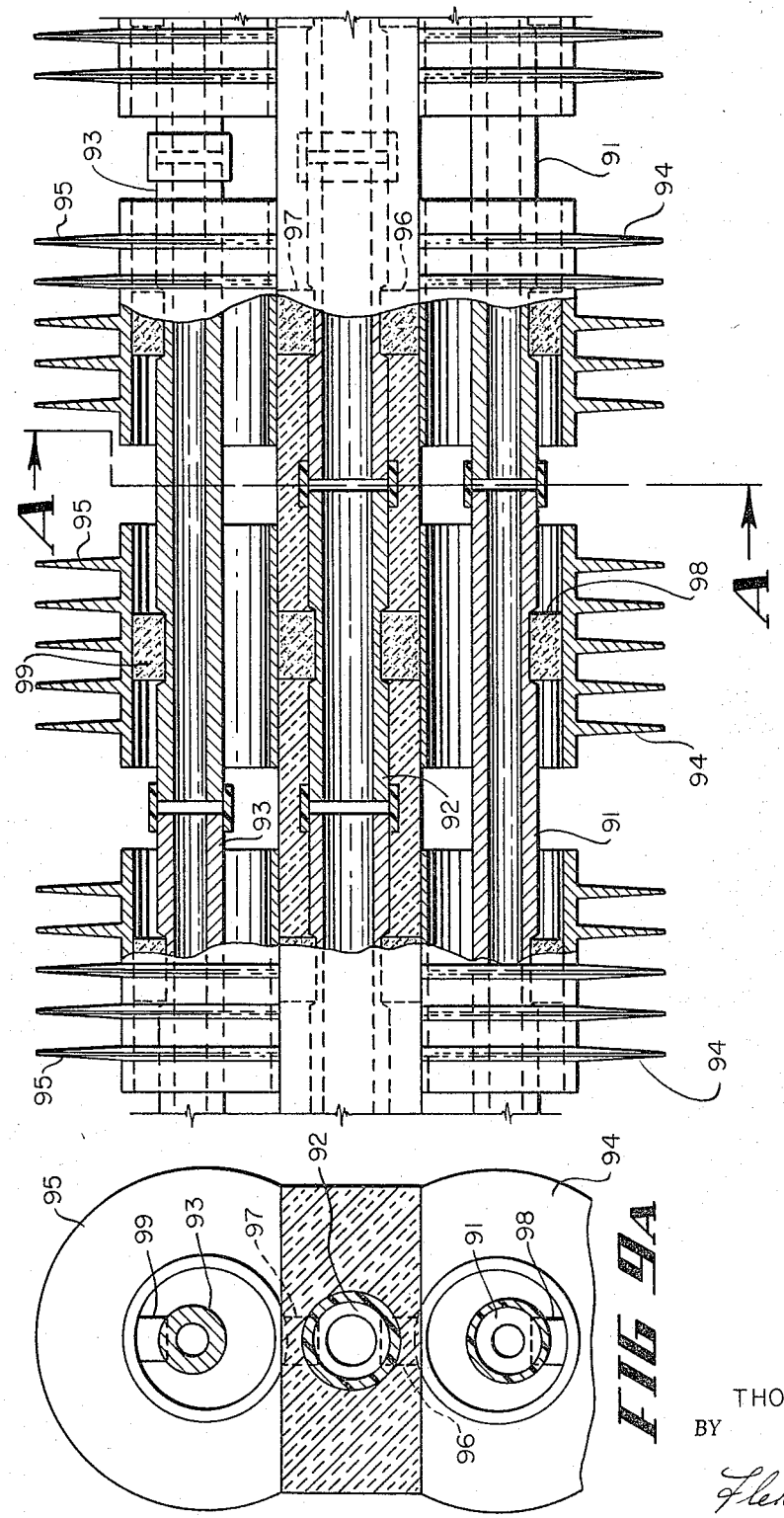

INVENTOR.
THORE M. ELFVING
BY
ATTORNEYS

Nov. 29, 1966  T. M. ELFVING  3,287,923
THERMOELECTRIC ASSEMBLY
Filed March 22, 1965    13 Sheets-Sheet 11
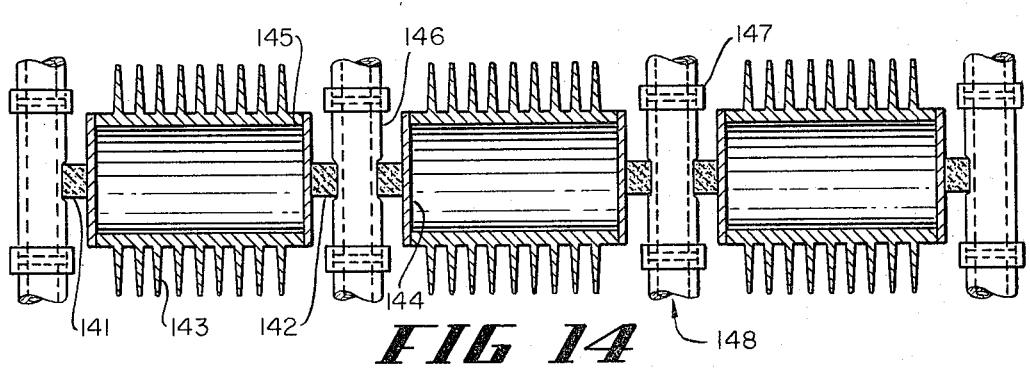
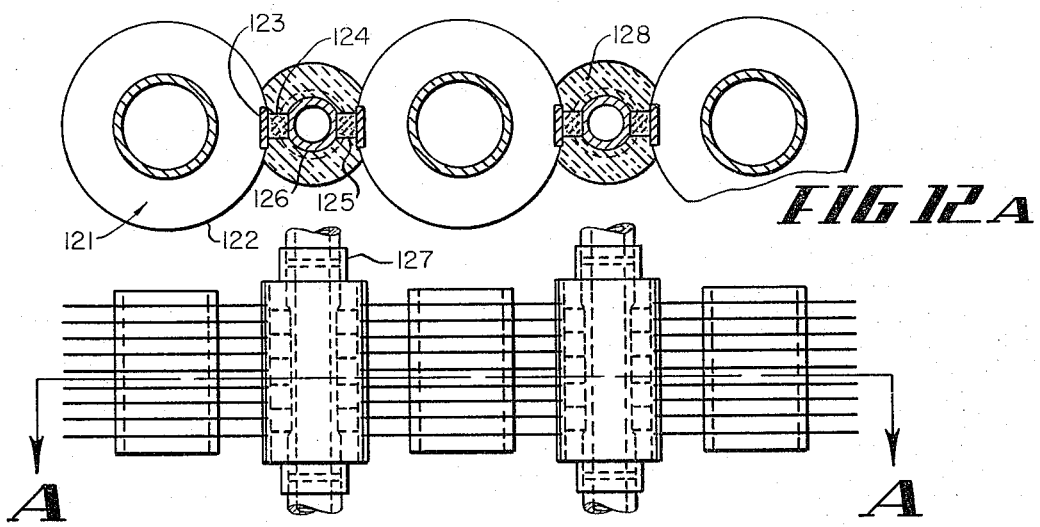
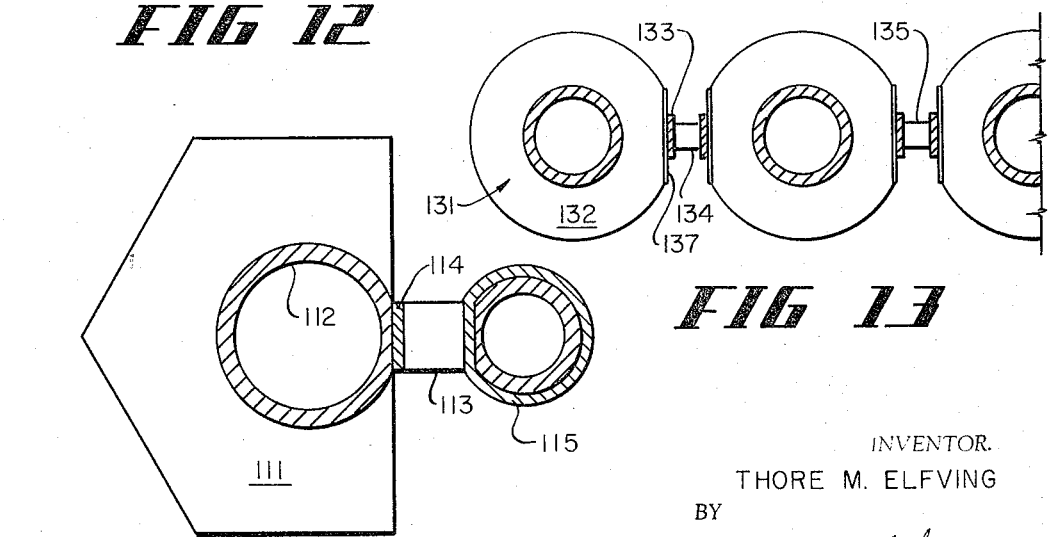
INVENTOR.
THORE M. ELFVING
BY
Flehr and Swain
ATTORNEYS United States Patent Office 3,287,923
Patented Nov. 29, 1966

3,287,923
THERMOELECTRIC ASSEMBLY
Thore M. Elfving, 433 Fairfax Ave., San Mateo, Calif.
Filed Mar. 22, 1965, Ser. No. 441,804
15 Claims. (Cl. 62—3)

The present invention relates generally to thermoelectric assemblies and more particularly to a thermoelectric heat pump assembly suitable for air conditioning, refrigeration, liquid cooling and the like.

It is a general object of the present invention to provide improved thermoelectric heat pump systems, namely: (1) liquid-to-air systems; (2) air-to-air systems; (3) air-to-air systems using a secondary fluid; and (4) air-to-air systems using secondary fluid and thermoelectric stages in cascade.

Generally, in the prior art, thermoelectric heat pump assemblies in liquid-to-air or air-to-air systems have included flat junction bridges, usually in the form of copper straps, having extended surfaces of various types. This has led to expensive and mechanically complicated systems. The heat exchange surfaces have been limited in size.

In my copending application Serial No. 343,678, filed Feb. 10, 1964, now Patent No. 3,196,620, there are described thermoelectric assemblies employing tube sections as hot and cold junction bridges in both liquid-to-air and liquid-to-liquid systems.

It is a general object of the present invention to provide a thermoelectric heat pump assembly including heat exchange surfaces which are formed from standard finned tubing, that is, tubing having outwardly extending external fins.

It is another object of the present invention to provide thermoelectric assemblies comprising hot and cold junction bridges in the form of finned tube sections or parts thereof in liquid-to-air or air-to-air thermoelectric heat pump systems.

The fin tube sections according to the invention can be made from copper tubing provided with external copper or aluminum fins. When copper fins are used, they are preferably of the true fin type, that is, the fins are extruded directly from the tubing wall. The fins may be separate and soldered or otherwise affixed to the tubing for good heat transfer. If aluminum fins are used, for lower weight, it may be of the true fin type, that is, extruded aluminum. In this event, an internal copper tube may be provided to form a compound pipe suitable for receiving thermoelectric elements. Although, in most instances the fins shown in the following description are round or circular, it is to be understod that the fins take any form such as square, hexagonal, elliptical, etc. The invention is not intended to be limited in this respect.

It is a further object of the invention to provide a thermoelectric assembly comprising first junction bridges in the form of finned tube sections, each section connected to similar ends of at least one pair of semiconductor bodies with the other ends of said bodies soldered to other tube sections serving as second junction bridges of opposite type and joined to each other to form a continuous conduit for receiving and conducting a liquid in direct heat exchange relationship with the junction bridges.

It is still a further object of the present invention to provide a thermoelectric assembly comprising junction bridges in the form of hollow finned tube sections with smaller tube sections disposed within said hollow fin tube sections serving as junction bridges of opposite type and joined to one another by nonconductive members to form a liquid-tight conduit disposed inside said fin tube sections.

It is still another object of the present invention to provide a thermoelectric heat pump assembly of the foregoing type in which the inside junction tube defines a liquid conduit disposed eccentrically with respect to the surrounding finned tube sections.

It is still a further object of the present invention to provide a thermoelectric heat pump employing a secondary liquid system cooled by an air-cooled thermoelectric assembly using finned sections as hot junction bridges.

It is still another object of the present invention to provide a thermoelectric heat pump assembly of the foregoing type in which the secondary liquid system cools the hot junction bridges of a second stage thermoelectric heat pump assembly in cascade with the air-cooled thermoelectric assembly over said liquid system.

The foregoing and other objects of the invention will become more clearly apparent from the following description when taken in conjunction with the accompanying drawings.

Referring to the drawing:

FIGURES 2 and 2A are sectional views of a portion of another thermoelectric heat pump assembly according to the invention;

FIGURES 3 and 3A are sectional views of a portion of a heat pump assembly where more than one pair of semiconductor bodies or blocks are used in each thermocouple;

FIGURES 4 and 4A are sectional views of portions of another thermoelectric heat pump assembly where more than one pair of semiconductor bodies are used in each thermocouple;

FIGURES 5 and 5A are views of a portion of another thermoelectric heat pump assembly;

FIGURES 7 and 7A are views, partly in section, of still another haet pump assembly;

FIGURES 8 and 8A are views, partly in section, of a further heat pump assembly;

FIGURES 9 and 9A are views of still another heat pump assembly;

FIGURE 11 shows schematically a heat pump assembly similar to that of FIGURES 5 and 5A but employing a different kind of material for the tubing per se;

FIGURES 12 and 12A are views of a heat pump assembly having the thermoelectric bodies joined to the fins;

FIGURE 13 is a sectional view of another heat pump assembly having the thermoelectric bodies joined to the fins;

FIGURE 14 is a view, partly in section, of another heat pump assembly having thermoelectric bodies connected to the ends of finned tube sections ;

Figure 1:
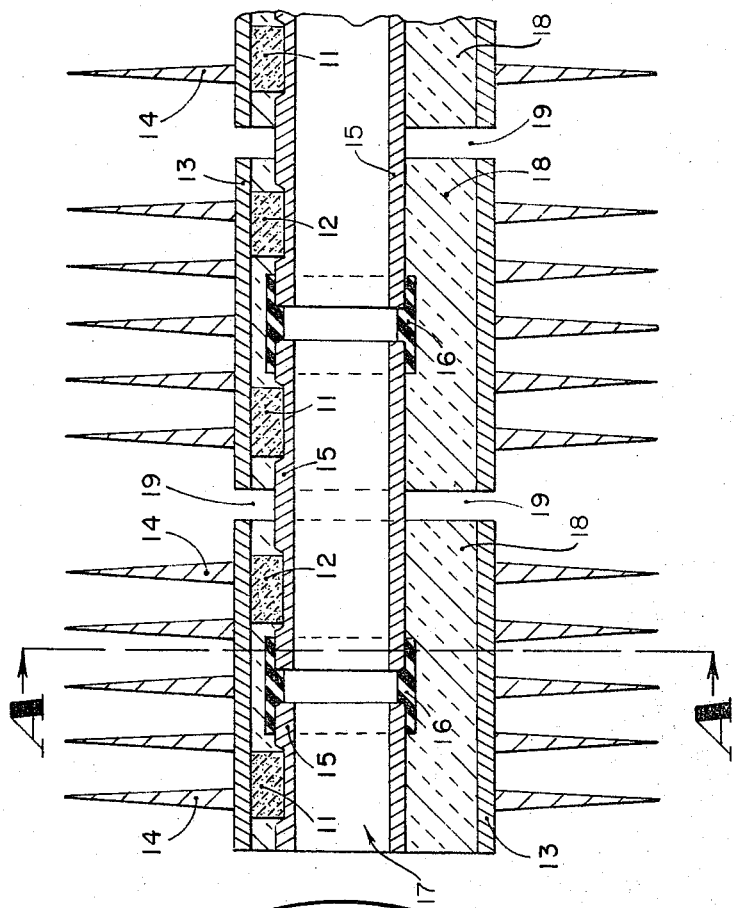
FIGURES 1 and 1A are sectional views of a portion of a thermoelectric heat pump assembly according to the invention.
Figure 1A:
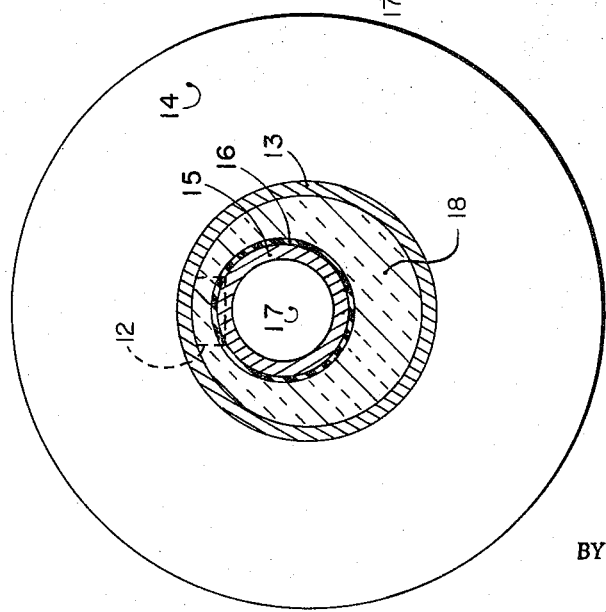

Referring to FIGURES 1 and 1A, there is shown a pair of semiconductor blocks 11 and 12 of n- and p-type material, respectively, each having one end, for example, the cold junction ends, soldered to the inside surface of a hollow finned tube section 13. In the description and claims which follow, the semiconductor elements which form the thermoelectric material are variously referred to as elements, bodies, blocks and rods. In each instance, this has reference to a solid compact member which may, for example, be square, rectangular or round in section and which has a predetermined length with the ends adapted to be joined to a cooperating junction bridge. The inside surface of the hollow finned tube sections may include a longitudinal groove which forms a flat surface for accommodating the associated thermoelectric bodies or blocks.

The hot junction ends of the semiconductor blocks 11 and 12 are soldered to the outside surface of smaller tube sections 15. The outside surface may be flattened to receive and accommodate the associated semiconductive bodies or blocks.

It is to be noted that the outer tube sections include fins 14 which may be made of aluminum, magnesium or other suitable high conductive, light-weight material.

The tube sections 15 are in the form of short hollow tube sections and are longitudinally aligned and joined to one another by nonconductive collars or rings 16. The ends of the copper tube sections may be attached to the collars by epoxy, cement or other suitable material to form a water-tight continuous conduit 17 for circulating a liquid in heat exchange relationship with the associated tube sections which form junction bridges for the thermoelectric heat pump.

The conduit 17 may be formed by a variety of other methods as, for example, by embedding the tube sections in closed cell foam insulation with the passages between the tube sections being tunnels in the insulation.

According to the invention, the difference in diameter between the hot and cold junction tube sections is selected to be great enough in relation to the length of the semiconductive blocks 11, 12 so that the conduit 17 runs eccentric within the finned tubing, as illustrated. The minimum distance between the hot and cold junction bridges is determined by the length of the semiconductive blocks. This is only a small portion of the overall surface area between the cylindrical generatrices along which the semiconductive blocks have been soldered. Everywhere else the distance will be larger and can, at the opposite generatrix, be as large as desired. In view of the relatively large surfaces exposed to each other between the hot and cold junction bridges in each thermocouple, the space between the tube-shaped junction bridges may, according to the invention, be filled with a suitable foam insulation 18 which also gives added strength to the thermoelectric assembly. A narrow slot or opening 19 between the cold junction sections 13 may be covered by a nonconductive collar or bandage for additional strength and air-tightness.

The thermocouple assembly is connected to a source of direct current so that the finned tube sections form one type of junction bridge. This depends on the direction of current flow, and the finned tube sections can either become hot or cold junction bridges.

The inside conduit 17 is connected to a liquid system for circulation of a liquid to be cooled or heated therethrough. Air is circulated over and across the finned tube sections. The described system represents a water-to-air conditioner or a water-cooled refrigeration system. The large heat exchange surfaces in the thermoelectric air conditioner of this type will provide efficient cooling with relatively small temperature difference resulting in a high coefficient of performance for the thermoelectric heat pump. As pointed out above, with reversal of the polarity of current, the heat flow between the cooling water and the air is reversed. The air is heated and the liquid cooled. In this reverse form, the described system represents an air-cooled liquid cooler.

Referring again to FIGURE 1, an electrical lead may, for example, be connected to a tube section 15, for example, the tube section on the left side of the figure, and another lead may be connected to a finned tube section 13 on the right-hand of the sheet paper. Current flow is then through section 15, through the semiconductor body 11, along the bridge formed by finned tube section 13, through the semiconductor body 12, along the next tube section 15, etc., providing a series flow of current through the semiconductor bodies with the hollow finned tube sections forming one set of junction bridges in heat exchange relationship with air and the other tube sections forming the other set of junction bridges in heat exchange relationship with a circulating liquid.

In FIGURES 2 and 2A, there is shown another design of heat pump assembly according to the invention. The semiconductor blocks 21 and 22 of different conductivity type material are soldered to junction bridges to form series connected thermocouples as before. The hot junction bridges are in the form of pipe sections 23 having a relatively small diameter longitudinally aligned in straight conduits 24 by connecting collars 25. The combination forms a conduit for the passage of cooling fluid such as water. Cold junction bridges are in the form of finned hollow tube sections 26 preferably made with inside copper tubing carrying outside aluminum fins 27. The finned tube sections are staggered by soldering the semiconductor bodies to opposite sides of the hot junction sections 23, one on each side, so that the cold junction sections can be attached on alternating sides of the central pipe or conduit 24 as shown in the drawings. The inside spaces may be filled with foam insulation as previously described. The heat pump unit operates by passing current so that it alternates between the inside junction bridges, through the semiconductive blocks, to the outside junction bridges. The advantage of the system of FIGURE 2 over that of FIGURE 1 is that more uniform air cooling is guaranteed by the location of the cold junctions on both sides of the assembly. This accommodates any temperature drops which might take place on the periphery of the fins.

FIGURE 3 shows a thermoelectric heat pump assembly having outer hollow finned tube sections and concentric inner tube sections which are longitudinally joined to form a conduit. The semiconductor blocks 31 and 32 of opposite conductivity type material are soldered in pairs between each of the hot and cold junction bridges 33 and 34 to form two parallel series of thermocouples with a common junction bridge. The inner bridges are in the form of hollow copper tube sections 33 connected to one another by means of collars 36 to form a conduit 35. The outer junction bridges are in the form of finned tube sections 34.

By placing the parallel semiconductor blocks on opposite sides of the tube sections and adjusting the length so that it corresponds to the distance between the inner surface of the finned tube sections and the outer surface of the inner tube sections, there is formed an assembly in which there is placed a plurality of semiconductor bodies in parallel. Parallel arrangement of the thermocouples doubles the heat pumping capacity and equalizes the temperature on the periphery of the fins. More than two parallel series of thermocouples can be arranged. If the thermocouples 31 and 32 are radially disposed at 90° around the periphery, four semiconductor blocks would be connected in parallel between the junction bridges with a corresponding increase in heat pumping capacity and maximum current.

This concept can also be used to lengthen the length of the semiconductive material and to provide more insulation between the concentric tubes while not lowering the heat transfer capacity. With two parallel blocks, the length can be doubled with the same current capacity. The gain is a smaller heat loss and more uniform temperature on the cold junction bridges. The cost is the use of twice as much semiconductor material.

More than one pair of semiconductive blocks in each thermocouple can be used in an eccentric design of the type shown in FIGURES 1 and 2. Referring particularly to FIGURES 4 and 4A, such a thermoelectric heat pump assembly is shown. Junction bridges are in the form of composite fin tube sections similar to those shown in FIGURE 1 and comprising outer copper tubing 40 and outer fins 41 of aluminum, copper or other good heat conductor. The copper tube sections include semiconductor bodies 42 and 43 soldered to the inside surface. A plurality of such bodies may be longitudinally arranged. For example, in the drawing there are three pairs of such bodies arranged longitudinally along the tube sections. Current passes through the bodies in parallel. The semiconductor bodies have their hot junction end soldered to the tube sections 44 which are longitudinally joined and aligned by collars 46 to provide a conduit for the circulation of a liquid or fluid.

The characteristic feature of the thermocouple assembly of this type is a large operating and maximum current and a correspondingly large heat pumping capacity in relation to the size of the semiconductive blocks used in the assembly. Long unbroken fin tube sections can be used which means fewer parts. The described design is suitable when power supplies with high amperage are available and semiconductive bodies with a relatively small cross-section area are desirable. Assemblies with two or more parallel blocks can also be used in series with ordinary single block assemblies for increased c.o.p. in the region where ΔT is relatively low along the path of the fluid to be cooled.

Parallel currents through more than one pair of semiconductive bodies reduces the risks of failure when one soldered joint is broken or develops high resistance. This system is also characterized by an improved heat exchange condition and weight reduction in comparison with systems using the same operating current through only one pair of semiconductive bodies per thermocouple. Current distribution and junction conditions are improved compared with conditions when only one pair of couples with the same current and the same cross-sectional area are employed.

In a water-to-air conditioning unit, the conduit 47 serves as the cooling water heat sink to cool the hot junctions while air is circulated over the cold fins as has already been described in connection with FIGURE 1. The heat pump assembly can also be used as a water-cooled refrigeration system for any kind of refrigerated space. The thermocouple design can also be used with current flowing in a reverse direction as air-cooled water or liquid cooler. Air for cooling of the hot junction is passed over the fins 41, while the liquid to be cooled is passed through the conduits 47 now comprising the cold junction. This double usability as a water-cooled air cooling unit or an air-cooled liquid cooling unit is characteristic of all the embodiments of the invention described and to be described hereinafter.

In the embodiments described above, the semiconductor bodies forming the thermocouples are fixed to the interior wall of the finned tubing. Thus, the arrangements described are either concentric or eccentric types with the continuous conduit within the finned tube sections. In the embodiments about to be described, the thermoelectric elements are fixed to the outside of the finned tubing. This is accomplished by removing a portion of the fins to form a seat on the exterior wall of the tube for receiving and attaching thereto the semiconductor blocks forming the thermoelectric junctions.

Where a compound pipe having an interior core of copper and exterior finned sleeve of aluminum, the aluminum tube as well as the fins may be removed to thereby expose the copper. The thermoelectric assemblies having exterior semiconductor blocks can be arranged in various configurations such as those described in my copending application described above.

In FIGURES 5 and 5A, there is shown a liquid-to-air thermocouple assembly employing hollow finned tube sections. The assembly includes a plurality of tube sections 51 joined to one another by collar-shaped rings or elements 52 to form a continuous pipe 55. The tube sections 51 form junction bridges for the dissimilar thermoelectric elements 53 and 54 which are suitably affixed to the outside surface of the same as, for example, by soldering.

Finned tube sections 56 form the other junction bridges. The fins are cut off as shown at 57 and the surface of the tubes 56 may be machined to present a flat surface or seat for receiving and accommodating the semiconductor blocks 53 and 54.

Current is then passed through the thermocouple assembly longitudinally along the same whereby the current flows through a finned tube section, through a thermoelectric element, through a tube section 51, back through another thermoelectric element, etc., to define hot and cold junctions, respectively. A fluid may be passed through the conduit 55. For one current direction or polarity, the fluid is cooled while heat is dissipated from the fins. For the other current direction, the fluid serves to cool the hot junctions while the cold junctions serve to cool the finned structure over which air is passed for air conditioning or refrigeration. Thus, by appropriately energizing the heat pump assembly, it will act as a water-cooled air cooler or an air-cooled liquid cooler.

Referring particularly to FIGURE 5A, it is seen that the plain pipe sections 51 can run in a direction perpendicular to the axis of the finned tube sections 56. In this instance, the finned tube sections are attached to semiconducting blocks on two adjacent conduits running perpendicular to the aligned finned tube sections. This will form a two-dimensional array instead of the linear arrangement shown in FIGURE 5. Such two-and three-dimensional assemblies are shown in my copending application mentioned above and are not described further herein. Using the principles outlined in this application together with those in my copending application referred to above, a great many combinations and variations of thermoelectric arrays can be built. The invention is not to be limited to the examples shown in this specification.

Figure 6:
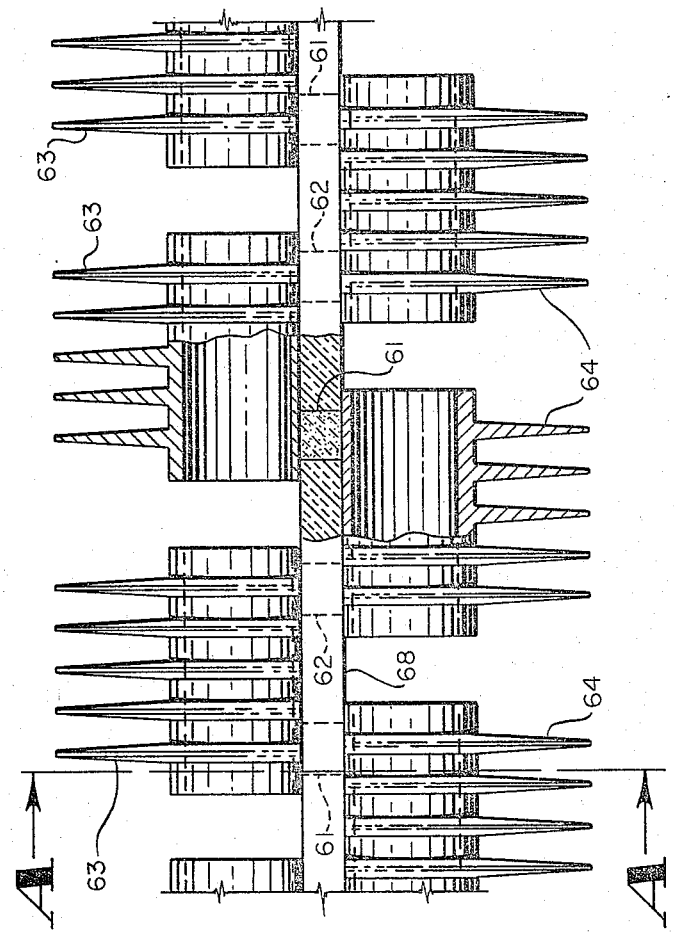
FIGURES 6 and 6A are views, partly in section, of a portion of another thermoelectric heat pump assembly.
Figure 6A:
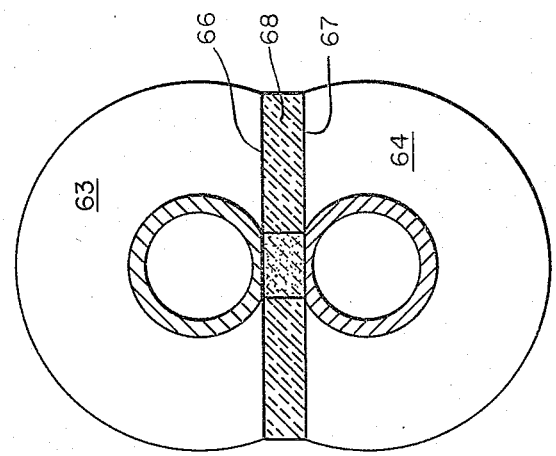

Referring to FIGURES 6 and 6A, there is shown an air-to-air heat pump employing a plurality of aligned and staggered finned tube sections forming hot and cold junction bridges. The semiconductor elements 61 and 62 are joined on opposite sides by junction bridges formed of sections of hollow finned tubing. Thus, one type of junction bridge is formed by the finned tube sections 63, while the other type of junction bridge is formed by the finned tube sections 64. The fins are cut out as shown at 66 and 67 whereby to provide a seat for the semiconductor elements. The space between the hot and cold junction fins and between the pipes may be filled with insulation 68. The thermoelectric assembly is energized by applying a current which flows back and forth between the junction bridges 63 and 64 and alternately through the thermoelectric elements 61 and 62 in the manner previously described. One set of junctions will form the cold junctions, while the other set forms the hot junctions. The unit is an air-to-air thermoelectric heat pump.

Referring to FIGURES 7 and 7A, there is shown another heat pump assembly. Pairs of semiconductor bodies 71 and 72 are soldered on opposite sides of tube sections 73 which are longitudinally joined by collars 74 to form a continuous conduit 75. The other ends of each of the pairs of semiconductive elements 71 and 72 are soldered to the central tube of finned tube sections 76 and 77. The fins are cut out to expose the tube and form a seat. Current flows from one junction bridge 76 through a pair of parallel thermoelectric elements 72, through a junction bridge 73, through a pair of elements 71, along a bridge 77, and back through another pair of elements 72, etc. The fluid-tight conduit 75 has fluid passing therethrough. Depending upon the direction of current flow, the fluid may serve as a cooling fluid to remove heat from the hot junctions of the thermocouples whereby the finned structure serves as an air cooler, or alternately, with the current reversed, the fins serve to dissipate heat while the thermoelectric bridges serve to cool the liquid. Thus, there is either, depending upon the polarity of current, a water-cooled air cooler or an air-cooled liquid cooler. Suitable insulation 78 may be provided to insulate the hot and cold junction bridges one from the other.

Referring to FIGURES 8 and 8A, there is shown a sectional view of a combination of finned tube section mountings of the type previously described. The assembly includes inside and outside mountings of semiconductive bodies to finned tube sections. Two pair of semiconductive elements are connected in parallel in each thermocouple. One type of semiconductor element 81 is soldered on the outside of the finned tube sections 82 where the fins are cut out, while elements 83 of the opposite conductivity type are soldered to the inside of the finned tube sections 82. The outside blocks 81 are on their other end soldered to plain pipe sections 84 which are joined by non-conductive collars 85 to form a fluid-tight conduit 86. The inside blocks 83 are soldered at their other end to plain tube sections 87, joined by non-conductive collars 88 to form a fluid-tight conduit 89. The conduit may be concentric or eccentric as shown. The assembly then forms a series of thermocouples with the cold junction ends on both sides of the finned tube sections 82 forming one type of bridge. Current would flow, as viewed in FIGURE 8, through the section 87, upwardly through the junction blocks 83, transversely across the finned tube section 82, through the junction blocks 81, into the plain tube section 84, longitudinally along section 84, upwardly through the next pair of junction blocks 81, transversely through the member 82, etc. This design provides for good temperature distribution on the fins since there are cold junctions disposed on each side of the finned structure whereby to provide a close heat conduction path from the junctions to the fins.

In FIGURES 9 and 9A, there is shown another manner in which various combinations of the finned tube sections can be arranged. In the schematic drawing there is shown a compound assembly comprising three liquids conduits formed by longitudinally aligned and joined plain tube sections 91, 92 and 93. Two finned tube section systems 94 and 95 form junction bridges of the opposite type. The plain tube 92, joined into a continuous conduit, has soldered thereto semiconductor bodies 96 and 97. These bodies have their opposite ends soldered to the finned tube sections 94 and 95 at the cut-out. The finned tube sections 94 and 95 surround tube sections 91 and 93, respectively. Semiconductor bodies 98 and 99 are soldered on the outside of the plain tube sections 91 and 93 and on the inside of the finned sections 94 and 95, respectively. The conduits 91 and 93 may be arranged eccentrically as illustrated.

The assembly forms a heat pumping assembly of thermocouples in series with heat exchange surfaces to air on both sides of central liquid systems formed by conduits 91 and 93 and to another liquid system disposed between the finned tube sections. The liquid systems may be insulated from the air systems by insulation 100 and by insulation inside the finned tube sections, not shown in the figures.

The current path is, for example, through an inside tube section 91, through a thermocouple body 98, transversely through a finned tube section 94, through a thermocouple body 96, across the tube section 92, through the thermoelectric body 97, across the finned tube sections 95, through the thermoelectric body 99 and then along tube section 93, through the next thermoelectric body 99, etc.

Figure 10A:
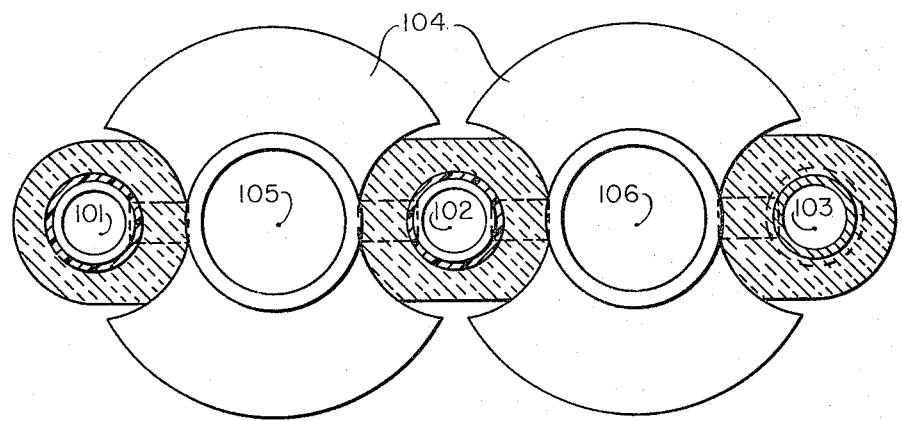
FIGURES 10 and 10A show a heat pump assembly in accordance with the invention.
Figure 10:
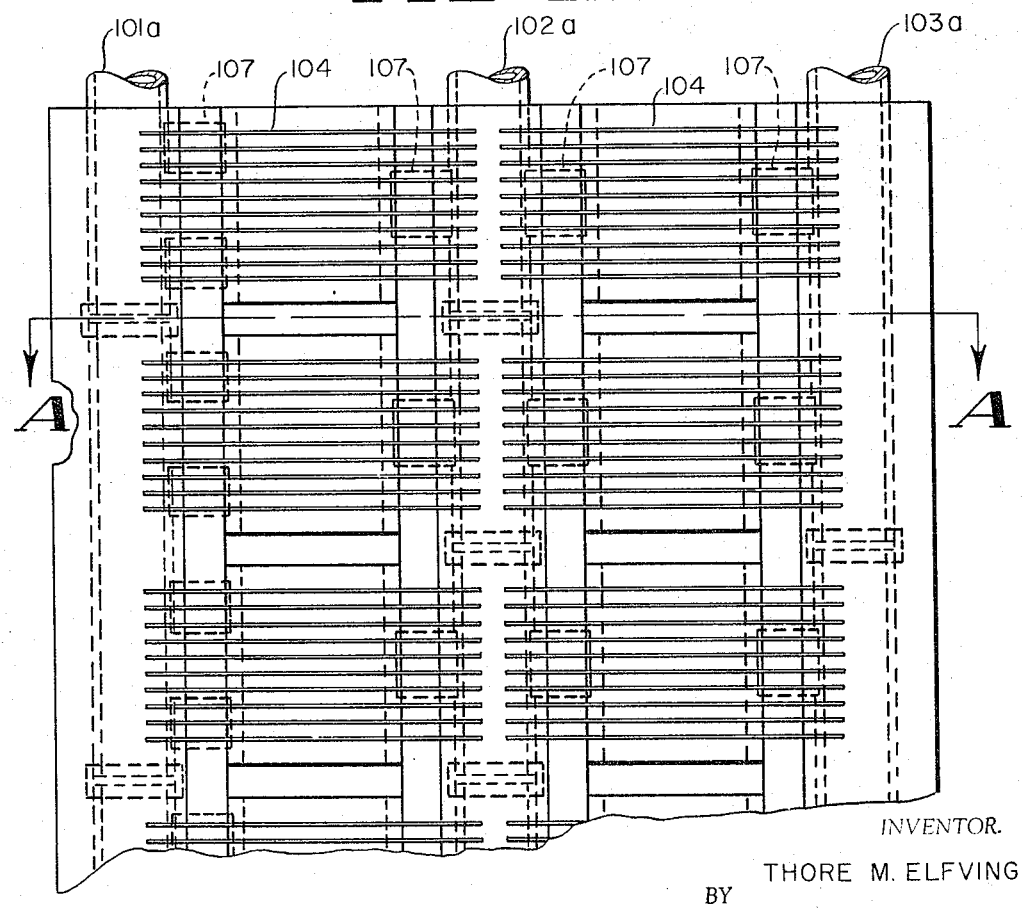

Referring to FIGURES 10 and 10A, there is shown a thermoelectric heat pump assembly comprising a plurality of parallel liquid conduits 101, 102 and 103. These conduits are formed of plain tube sections which are longitudinally aligned and joined by nonconductive collars, as previously described. The tube sections form the hot junction bridges of a thermoelectric assembly as will be presently described. A plurality of finned tube sections 104 longitudinally aligned in rows 105 and 106 are provided and form the cold junction bridges. Thermoelectric elements, single or two or more in parallel, are disposed between the hot and cold junction bridges and current may, for example, be passed through the upper element 101a, through the thermoelectric elements 107 and through the finned tube sections 104 to the tube section 103a, at which time the current flows longitudinally downward and back through the assembly to provide series flow of current through the various thermoelectric bodies and tube sections. The arrangement shown consists of three conduits and two rows of finned tube sections. However, it is clearly understood that this arrangement may be expanded in both directions and that a plurality of panels of this type may be disposed one above the other to form a three-dimensional array. By appropriately passing current through this assembly, the coolant will serve to remove heat from the hot junction while the temperature of the finned structure is lowered and air passing over the surface of the finned structure will be refrigerated to provide a compact water-cooled air conditioned unit. By reversing the current, the described system represents an air-cooled liquid cooler of high efficiency. As indicated in FIGURE 10 and for reasons mentioned in connection with FIGURE 7, the assembly can comprise junction bridges with two or more parallel semiconductive bodies in series with ordinary thermocouples using only one semiconductive body of each type. This leads to a design where at a certain region in the path of the heat exchange fluids there will be a change-over type of junction bridge having, for instance, one semiconductor body of one type and two of an opposite type connected thereto as illustrated in the figure.

In the foregoing description there have been described various types of finned tube sections. For example, finned tube sections which are extruded and made entirely of copper whereby the fins and tube are an integral unit. There have also been described finned tubing which includes a central copper tube with aluminum fins suitably affixed thereto as, for example, by welding or the like. There have also been described tube sections which include a central copper tube with an outside shroud of finned aluminum.

It is possible, in accordance with the present invention, to also employ tubing which is made entirely of aluminum. For instance, a strap or sleeve of copper or other suitable metal may be affixed along a longitudinal portion of a tube whereby to provide means for soldering thereto the thermoelectric blocks. An example is shown in FIGURE 11. Aluminum finned tube section 111 includes hexagonal fins with the fins partially cut away to expose the pipe 112. Interposed between the semiconductor element 113 and the tube 112 is a strap 114. The strap is selected so that it can be conveniently bonded to the aluminum and also serves to form a good bond with the associated thermoelectric element. For a plain aluminum pipe section, a sleeve 115 can be employed. It is to be clearly understood that the finned tube sections may be formed of various materials and that any process known in the art may be employed for securing the semiconductor bodies thereto.

By using copper straps for receiving the semiconductive bodies, it is possible to mount the bodies directly to the fins of the finned tube sections rather than on the central tube. In FIGURES 12 and 12A there is shown such an embodiment of the invention where finned tube sections 121 with fins 122 of copper, aluminum or any suitable metal. Straps 123 of copper or other suitable material are affixed to the edges of the fins, preferably in a groove formed on the edges on opposite sides of the central tube. Alternatively, the edge of the fins may be bent or upset to provide a seat for the copper strap. This type of seat provides a larger contact area for the copper strap. Semiconducting blocks 124 and 125 of dissimilar material have similar junction ends connected to other tube sections 126. The sections 126 are joined by nonconductive collar means 127 to form conduits for receiving and conducting a liquid. Insulation 128 may be provided for insulating the hot portions of the assembly from the cold portions.

The described thermoelectric assembly forms thermocouples in series with each pair of junction bridges having single or two or more semiconducting bodies in between them depending upon the working conditions of the heat pump. Three bodies are shown in parallel in the drawing. This provides for distributing the current to give more uniform temperature on each fin when the finned tube sections are relatively long. Depending on how the assembly is energized, an array of this type may serve as an air-cooled liquid cooler or as a liquid-cooled air cooler.

In FIGURE 13 is shown a similar arrangement for air-to-air heat pumps. The finned tube sections 131 with fins 132 of suitable material are as before provided with copper straps 133 joined to the "upset" edges 137 of the fins. Semiconductive bodies 134 and 135 of dissimilar type have similar junction ends affixed to straps 133.

Referring to FIGURE 14, there is shown a liquid-to-air thermoelectric heat pump assembly comprising semiconducting bodies 141 and 142 of dissimilar conductivity type soldered at similar junction ends to the ends of hollow finned tube sections 143 covered at their ends by copper plates or straps 144 for even distribution of current and heat flow around the periphery of the central tubes 145. The central tube and the fins may be of aluminum or any other suitable light-weight metal with the end plates or straps 144 soldered thereto by suitable means for affixing copper to aluminum. The semiconducting bodies 141 and 142 are at their opposite junction ends soldered to other sections 146 of copper, of the type previously described, joined together by nonconductive means 147 to form tight liquid conduits 148 running perpendicular to the direction of the aligned axes of the tube sections 143. Each finned tube section 143 in heat exchange to air is in this way connected to two adjacent liquid conduits with semiconducting material mounted in between. The finned tube sections 143 serve as junction bridges of one type, while the tube sections 145 serve as junction bridges of opposite type, together forming thermocouples in series incorporated in a larger heat pump assembly as previously described. The assembly serves in one current direction as a liquid-cooled air cooler, and in the opposite current direction as an air-cooled liquid cooler. In an array according to FIGURE 14, the direct current between the dissimilar semiconductive bodies on each side of the finned tube sections passes the finned junctions entirely through the central tube 145 while the heat flow is distributed by the central tube to all the fins in heat exchange to air for maximum c.o.p. Several rows of finned tube sections along the liquid conduits, one for each conduit section, will form a large heat pump assembly of great simplicity with the liquid conduits joined at their ends to form a liquid system of suitable type.

Finned tube sections of the type shown in FIGURE 14 can, in the usual way, be mounted with semiconductive bodies directly between them to form air-to-air assemblies as previously described.

The finned tube sections form thermocouples in series, alternate tube sections serving as hot and cold junction bridges in heat exchange relation to air over their respective fins. The systems may serve as an air-cooled air cooler or air conditioning unit with a parallel flow of the air coolant and the air to be cooled. In practice, the two air flows, whether in counterflow or not, have to be separated by preferably insulated partitions, not shown in the figure.

Figure 15:
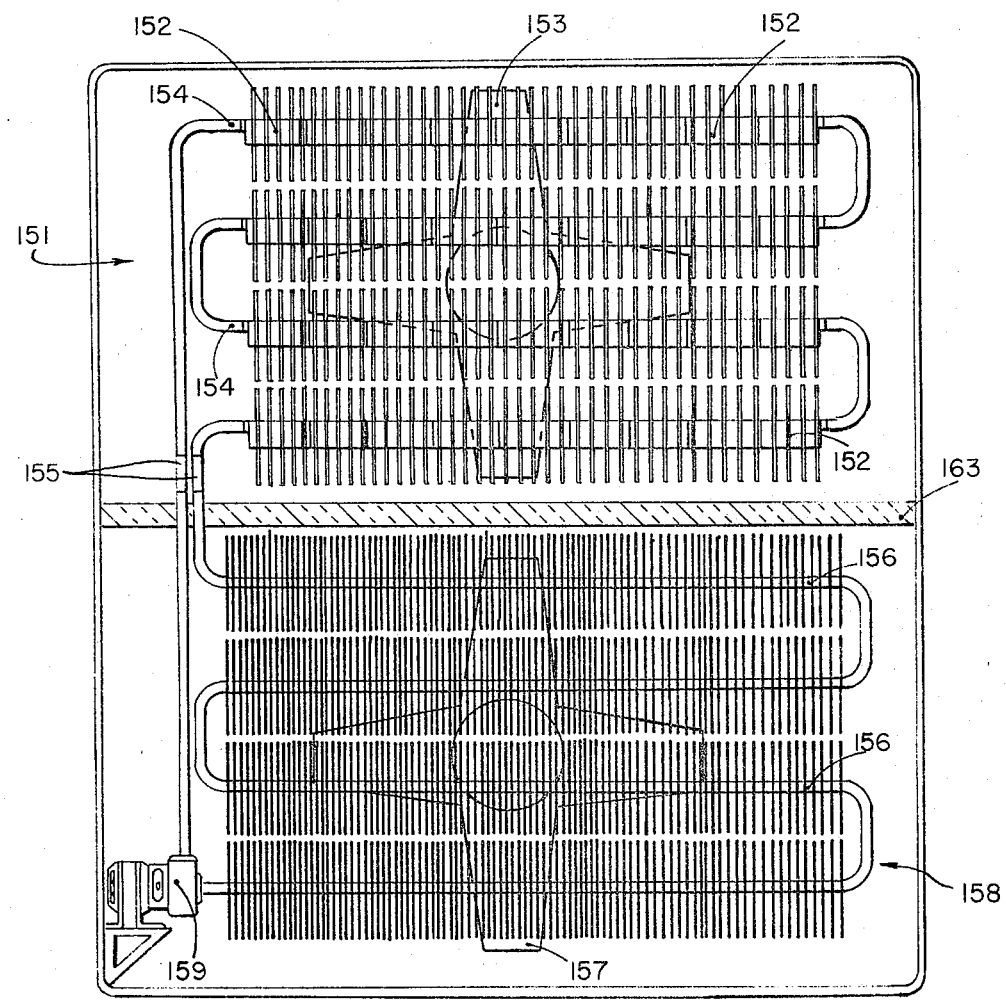
FIGURE 15 is an elevational view of an air conditioner incorporating thermoelectric heat pump assemblies in accordance with the present invention and employing a secondary liquid.

According to the invention, heat pumps and heat pump assemblies of the type described may be used for air-cooled air conditioning or refrigeration systems using a secondary fluid. Referring particularly to FIGURE 15, there is schematically shown an air conditioning system employing one type of heat pump assembly. It is apparent that any of the other liquid-to-air types of heat pump assemblies may be employed in the system shown and such alternatives are not described in detail.

Referring to FIGURE 15, there is shown an air-cooled liquid cooler 151 comprising finned tube sections 152 serving as hot junctions in the thermocouple assemblies. The heat from the hot junction is removed by air circulating over the fins. The air may be circulated by a fan 153, or by natural convection. Inside the finned tube section 152 are liquid conduits 154 comprising cold junction bridges of the type previously described. The conduits 154 in the several rows of thermocouple assemblies connected in series in the liquid cooler 151 are joined to a system of plain finned pipes 156 by a section of electrically nonconductive pipe 155. The finned pipes are arranged to form a liquid-to-air heat exchanger 158 through which liquid or brine from the liquid cooler 151 is circulated by means of a suitable pump 159. The liquid-to-air heat exchanger is electrically isolated from the thermoelectric liquid cooler 151 and can, therefore, be provided. A liquid storage tank may be provided between the heat exchanger 158 and the inlet side of the pump 159. The thermoelectric heat pump assembly is energized from a power supply, and thermostatic means and modulators of known type may be provided for control.

The system can operate as an air conditioner by energizing the heat pump assembly in such a way that the finned tubing sections 152 become the hot junction bridges and the conduit 154 the locus for the cold junction bridges, thereby cooling the liquid or brine circulating in the secondary liquid system. Heat from the hot junctions is dissipated in the air by air passing over the fins. The cooled brine absorbs heat in the heat exchanger 158 where the air to be cooled is forced through the finned pipe system by the fan 157. Heat absorbing and heat dissipating parts of the system are connected to each other only by liquid lines and can be separated in space and turned in any position for a convenient arrangement of air ducts, etc. In the drawing they are shown separated from one another by an insulating wall 163. When the thermostat calls for heating, the current polarity in the thermoelectric heat pump is reversed which results in heating of the brine in the secondary liquid system and of the air passing through the heat exchanger 158. The brine circulating pump 159 can be continuously operated. During low heat load periods, the fan 157 may be stopped to provide continued lowering of the temperature of the brine until freezing temperatures are reached. Storage of the refrigeration capacity can take place by ice freezing in water containers or cells placed inside the storage tank. Whether such a tank is suitable depends upon the size and type of the air conditioning system required.

It is apparent that an air conditioner of the foregoing type may also be conveniently used for air conditioning trucks or other motor vehicles. In such instances, the air is forced past the finned tube sections as the vehicle is moving. The heat exchanger 158 may be located in the cab with a fan for circulating the air within the cab.

When lower temperatures are wanted, as in a railway refrigerated car, a two-stage thermoelectric system including a secondary liquid system can be used. Such a system can be energized by a diesel electric generator plant combined with a battery. The principles for such a two-stage system will be outlined in connection with the following FIGURE 16 where a two-temperature refrigerator according to the invention is described.

Figure 16:
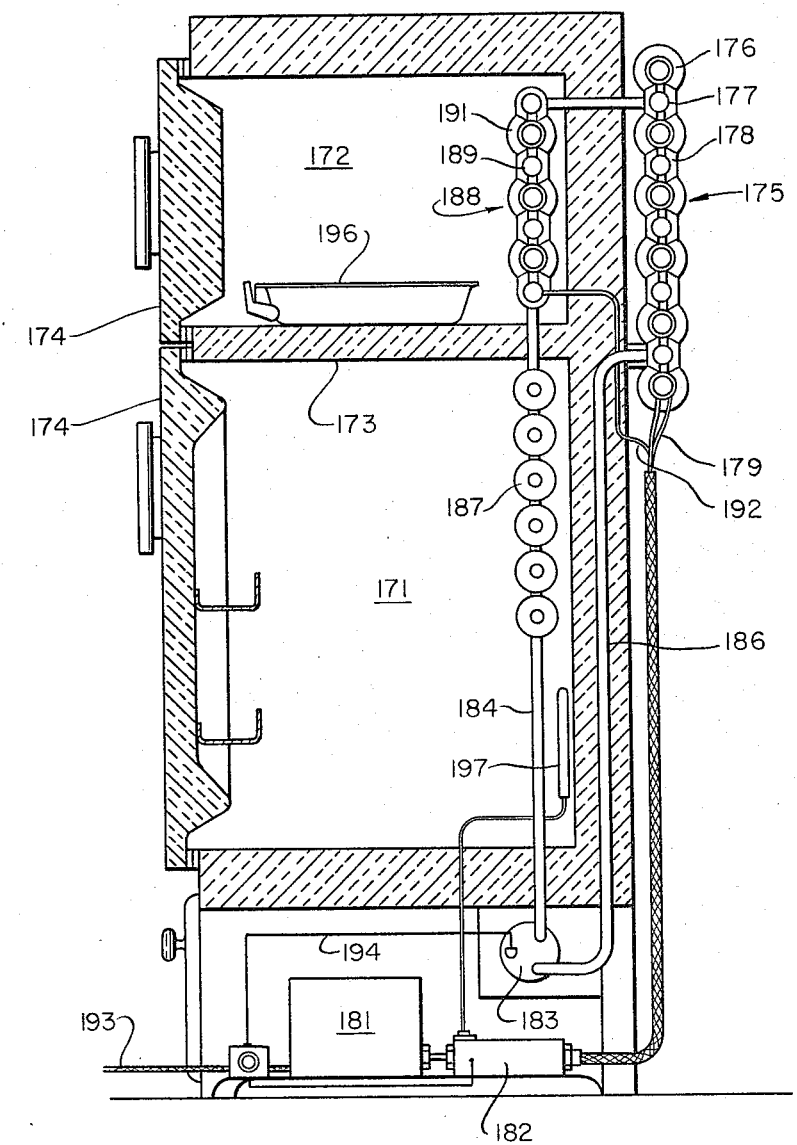
FIGURE 16 is an elevational view, partly in section, showing a refrigerator incorporating thermoelectric heat pump assemblies in accordance with the present invention and employing a secondary liquid.

Referring to FIGURE 16, there is shown a thermoelectric two-temperature refrigerator. The refrigerator include an insulated refrigerated compartment 171 and an insulated freezer compartment 172 separated by an insulated partition 173. Doors 174 provide access to the compartments. The refrigerator is of the air-cooled type with a thermoelectric heat pump assembly of the type described acting as a liquid cooler 175. The liquid cooler is disposed on the rear of the refrigerator. The thermoelectric liquid cooler 175 shown is of the type described with respect to FIGURE 10. It comprises hot junction bridges in the form of finned tube sections 176 and cold junction bridges in the form of tube sections joined into liquid conduits 177 insulated by an insulation 178. The liquid cooler is energized by direct current through the leads 179 from a power supply 181 and a modulator or control 182 located under the refrigerator. The liquid system contains a suitable brine or coolant circulated by a pump 183 through the insulated pipes 184 and 186 to a heat exchanger 187 of suitable type; for example, a finned pipe system located in the refrigerated space 171 for the cooling of the air in said space by natural convection or forced air circulation. The liquid pipe system is directed into the freezer compartment 172. A thermoelectric low temperature heat pump assembly 188 serves to lower the temperature in the freezer compartment below freezing. The assembly 188 is similar to the liquid cooler 175. The current flow is reversed so that it functions as a liquid-cooled air cooler. From the freezer compartment 172 the liquid pipe system leads back to the liquid cooler 175 which now acts as the main stage, cooling the hot junction side of the low temperature heat pump 188 which is in cascade with the main stage over the secondary liquid system.

The assembly 188 comprises hot junctions in the form of tube sections joined into liquid conduits 189 through which the coolant is circulated. The cold junctions are in the form of finned tube sections 191 in heat exchange with the air in the freezer compartment.

The cascade heat pump is electrically energized through the leads 192 from the power supply 181. The pump 183 is connected to the A.C. inlet 193 by the lead 194.

The refrigerator is, in the usual way, provided with ice freezing trays 196 in the freezer compartment. The liquid system can serve as a heat sink for thermoelectric modules with ice freezing taking place in heat transfer contact with the cold side of the modules or in any known way by ice freezers of the liquid-cooled type.

The refrigerator functions as described after energizing the heat pumps 175 and 188 and the circulating pump 183. The temperature can be controlled by thermostat means 197 in combination with the modulator 182 of known type.

The two-stage system is flexible and the main components can be placed in any position and in almost any distance from each other when connected by insulated liquid lines of suitable type. The system is independent of gravity when using circulation fans for forced air. The heat pump assemblies can be of any liquid-air type previously described or combinations thereof.

Thus, it is seen that improved thermoelectric heat pump systems are provided with practically unlimited heat exchange surfaces to air on either the hot or the cold side. Ordinary finned tubing sections can be used as junction bridges and plain or compound pipes of standard manufacture from copper and aluminum can be used for low weight and high efficiency with a minimum of machined parts. Thermoelectric heat pump systems according to the invention are simple in construction and economical to operate in both water and air cooled devices.

I claim:

1. A thermoelectric assembly of the type including pairs of semiconductor elements of n-type and p-type thermoelectric material having first and second spaced surfaces, first junction bridges connected between the first surfaces of each of said pairs of elements, second junction bridges connected between the second surface of said semiconductor elements to form thermocouples, at least one of said first or second junction bridges being in the form of short lengths of hollow finned tubes having outwardly extending heat transfer fins.

2. A thermoelectric assembly according to claim 1 in which said lengths of finned hollow tubes serving as junction bridges are joined to the semiconductor elements on the outside of the lengths of tube.

3. A thermoelectric assembly according to claim 1 in which said lengths of finned hollow tubes serving as junction bridges are joined to the semiconductor elements on the edges of said fins.

4. A thermoelectric assembly as in claim 1 in which said lengths of finned hollow tubes serving as junction bridges are joined to the semiconductor elements at each end of the tube sections through metal members affixed to the ends of the lengths of tube.

5. A thermoelectric assembly according to claim 1 in which said lengths of finned hollow tubes serving as junction bridges are joined to the semiconductor elements on the inside of the lengths of tube.

6. A thermoelectric assembly according to claim 1 in which said finned hollow tube sections are joined to the semiconductor elements on both the outside and the inside of the lengths of tube.

7. A thermoelectric assembly comprising at least one pair of semiconductive blocks of opposite type, first junction bridges in the form of short lengths of finned hollow tubes, said junction bridges connected to similar ends of said one pair of semiconducting blocks, second junction bridges in the form of short lengths of tubes connected to the other ends of said semiconducting blocks joined to each other to form a continuous conduit for receiving and conducting a liquid in direct heat exchange relationship with said junction bridges of opposite type.

8. A thermoelectric assembly according to claim 7 in which said conduit is disposed within said finned hollow tube lengths.

9. A thermoelectric assembly according to claim 8 in which the inside conduit is disposed eccentrically with respect to the surrounding finned tube lengths.

10. A thermoelectric assembly according to claim 7 in which said first junction bridges in the form of finned hollow tube sections represent the hot junctions of the assembly while the other tube sections joined into a conduit are cold junctions for cooling a liquid flowing in said conduit, said assembly thereby serving as an air-cooled liquid cooler; a liquid-to-air heat exchanger, means forming a closed liquid system including said heat exchanger and said conduit, and means for energizing said thermoelectric assembly to form an air-to-air cooling system including a secondary liquid phase.

11. A thermoelectric heat pump assembly according to claim 10 in which said heat exchanger to air comprises a finned pipe system over which air is circulated by means of a fan.

12. A thermoelectric heat pump assembly according to claim 10 in which said means forming a closed liquid system includes a length of electrically nonconductive pipe to thereby electrically isolate the air-cooled liquid cooler from the liquid-to-air heat exchanger.

13. A thermoelectric assembly according to claim 7 in which said first junction bridges in the form of finned hollow tube sections represent the hot junctions of the assembly while the other tube sections joined into a conduit are the cold junctions for cooling a liquid flowing in said conduit, said assembly thereby serving as an air-cooled liquid cooler; means forming a closed liquid system including a circulating pump, said closed liquid system forming a heat sink for cooling the hot junction side of another thermoelectric heat pump assembly to thereby place the same in cascade with said first heat pump assembly through said liquid system.

14. A thermoelectric heat pump assembly according to claim 13 in which said heat sink for cooling the hot junction side of another heat pump assembly is in the form of metal tube sections serving as hot junction bridges and joined together by nonconductive means to form a conduit incorporated in said liquid system.

15. A thermoelectric assembly of the type including pairs of semiconductor elements of n-type and p-type thermoelectric material each having first and second spaced surfaces defining hot and cold ends, first short lengths of hollow pipe adapted to be connected to similar junction ends of said pairs, second short lengths of hollow finned pipe adapted to be connected to the other junction ends of said semiconductor elements, means for electrically and thermally connecting the ends of said short lengths of finned pipe sections to said thermoelectric elements, and means for connecting the sides of said first length of hollow pipe to said thermoelectric elements whereby the lengths of hollow finned pipes have their axes disposed substantially perpendicular to the axis of the lengths of hollow pipe.

References Cited by the Examiner
UNITED STATES PATENTS

| | | | |
|---|---|---|---|
| 2,919,553 | 1/1960 | Fritts | 62—3 |
| 2,949,014 | 8/1960 | Belton | 62—3 |
| 2,959,017 | 11/1960 | Gilman | 62—3 |
| 2,959,925 | 11/1960 | Frantti | 62—3 |
| 3,054,840 | 9/1962 | Alsing | 62—3 |
| 3,083,543 | 4/1963 | Stanton | 62—3 |
| 3,097,027 | 7/1963 | Mims | 62—3 |
| 3,167,926 | 2/1965 | Wepfer | 62—3 |
| 3,178,894 | 4/1965 | Mole | 62—3 |
| 3,178,895 | 4/1965 | Mole | 62—3 |
| 3,196,620 | 7/1965 | Elfving | 62—3 |
| 3,197,342 | 7/1965 | Neild | 62—3 |
| 3,212,275 | 10/1965 | Tillman | 62—3 |
| 3,213,630 | 10/1965 | Mole | 62—3 |

WILLIAM J. WYE, *Primary Examiner.*